INVENTOR.
Richard E. Moroney

April 22, 1958     R. E. MORONEY     2,831,226
FASTENING DEVICES

Filed Jan. 3, 1955     2 Sheets-Sheet 2

INVENTOR.
Richard E. Moroney

United States Patent Office 2,831,226
Patented Apr. 22, 1958

2,831,226

FASTENING DEVICES

Richard E. Moroney, Evanston, Ill.

Application January 3, 1955, Serial No. 479,506

7 Claims. (Cl. 24—1)

My invention relates to seam closure for securing flexible objects together, such as sleeves to garments, wherein while such objects are not separable, each of said objects is movable relatively to the other in a circumferential direction without producing distortion or strain upon the object itself or any of the parts thereof.

Another and further object of my invention is the provision of a partially closed unit in the form of an endless track or guide channel within which a second unit or runner of endless form is mounted, the partially closed track or guide channel being composed of a plurality of partially closed links placed in end-to-end closely spaced relation with each other preferably upon a flexible strip or continuous band of fabric, and a second unit consisting of a series of closely spaced links also preferably secured to a flexible strip or continuous band of material of slightly smaller diameter, said links having slide portions or flanges extending into and retained within the partially closed track or guide channel in the form of a runner freely movable in the guide channel in a continuous rotary or circumferential movement or in a reciprocating manner in a lesser arc if the necessary function is performed by such limited movement.

Another and further object of my invention is the provision of a flexible substantially circular endless guide channel and a flexible substantially circular endless runner in the said guide channel, the guide channel being composed of small links secured to a continuous band of flexible material, the links being partially closed and placed in end-to-end registered relation with each other so that a circular endless track is provided within which a circular endless runner is mounted and retained so that both the track and the runner are freely movable relatively to each other in the same plane and also in which a slight torsional movement of the members may be made without destroying the movable relation of the track and the runner.

Another object is the provision of means whereby the sleeve of a garment such as a coat may be attached to the body of the garment in such manner that the sleeve is capable of being moved with the arm of the wearer to a plurality of directions in the same plane, or in a continuous rotary manner either forward or backward without stress or strain upon the garment and without pulling the body of the garment out of its normal position, and without strain upon the wearer if the garment is a heavy one such as a heavy overcoat which is commonly worn by policemen, soldiers or the like, or in other situations where the raising and lowering of the arms for manual operations is necessary.

Another and further object of the invention is the provision of means whereby circular, elliptical or ovate objects may be secured together in such a manner that continuous movement or intermittent reciprocal movement in the circumferential direction may be freely performed regardless of whether the contour of the perimeter of the objects changes from circular to elliptical or ovate forms during operation.

Another and further object is a provision of attaching means in which both the links forming the track and also the links forming the runner can be separately secured to flexible closely woven strips of material of desired length and in which both the track and runner links are placed in end-to-end relation to each other with the runner links having a slide portion thereon of greater width than is the spacing between the flanges of the track links so that when placed in position the two units will remain together and its strips or bands of material can be sewed or stitched onto the proper portions of a garment or other flexible object to perform the function intended.

These and other objects of my invention will be more fully and better understood by reference to the accompanying drawings and in which Fig. 1 is a diagrammatic view of the upper portion of a coat having a sleeve secured thereto by my invention showing the sleeve in normal suspended position;

Figure 1:
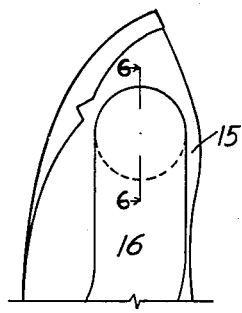
Figure 2:
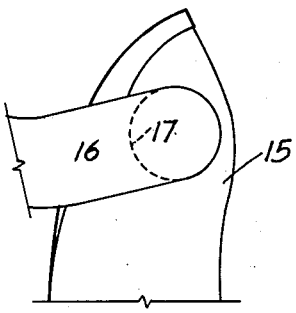
Fig. 2 is a view similar to Fig. 1 with the sleeve in an extended forward position.
Figure 3:
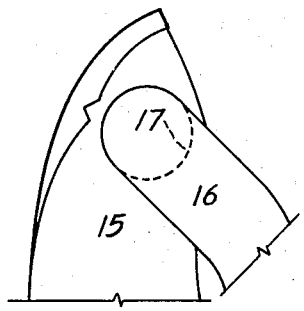
Fig. 3 is a view similar to Fig. 1 with the sleeve directed in a rearward position.
Figures 4, 5, 6:
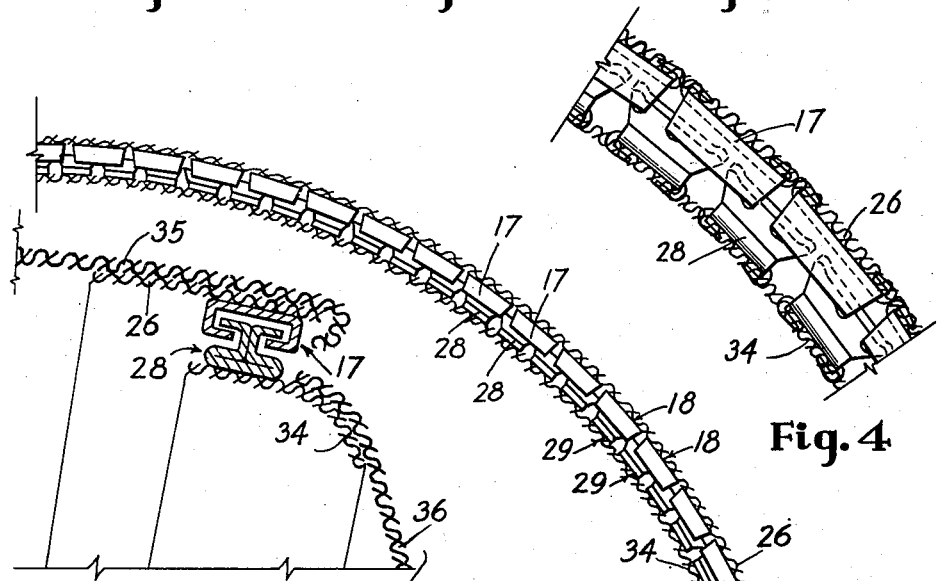
Fig. 4 is a detailed elevational view of the track and runner members in operative relation with each other.
Fig. 5 is an elevational view of a segment of the sliding seam closure in use on the sleeve of a garment such as shown in Fig. 1.
Fig. 6 is a partial cross sectional view through the sleeve and shoulder portion of a coat on line 6—6 of Fig. 1.
Figure 7:
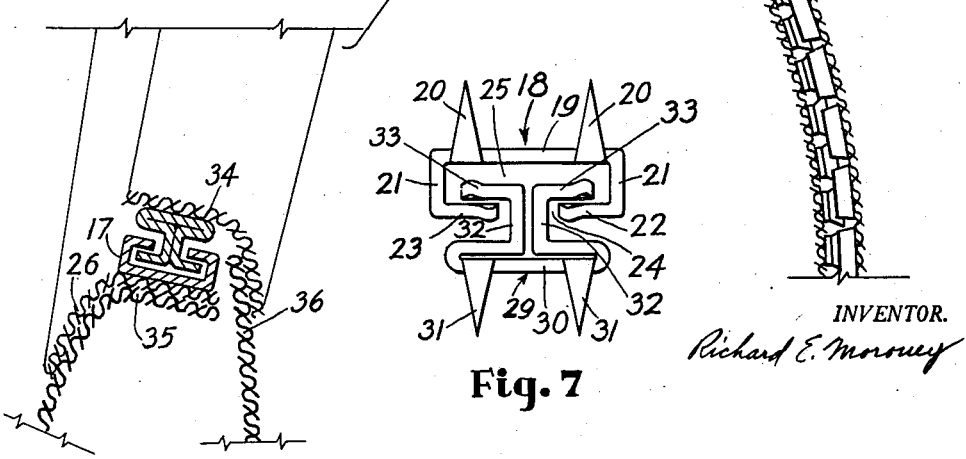
Fig. 7 is an end elevational view of a single track link and a single runner link in operative relation with each other.
Figure 8:
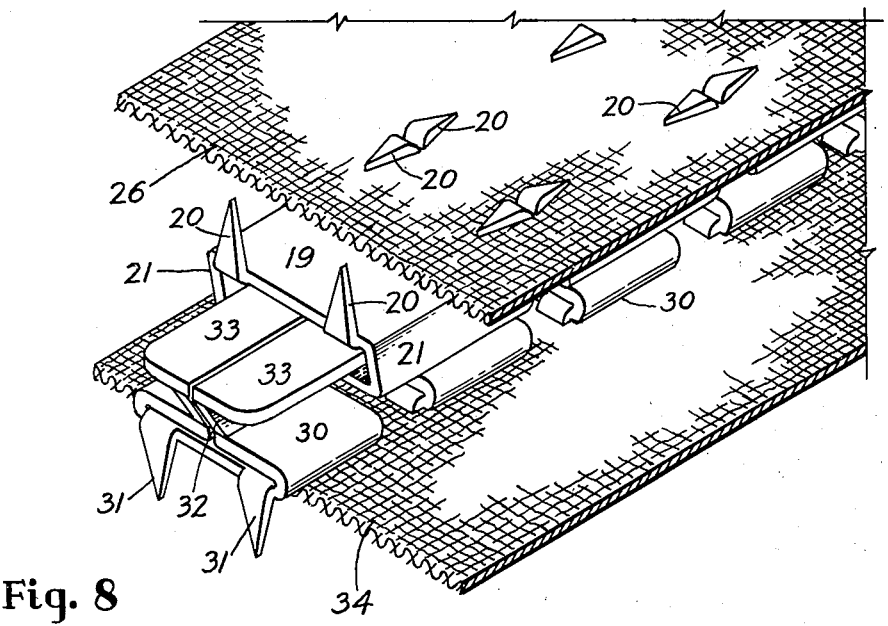
Fig. 8 is an isometric view showing bands of flexible material with the co-operating track and runner links secured thereto.
Figure 9:
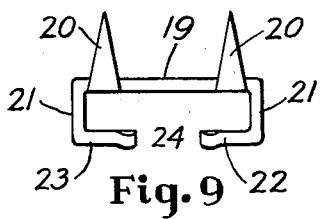
Fig. 9 is an end elevational view of a partially closed track link.
Figure 10:
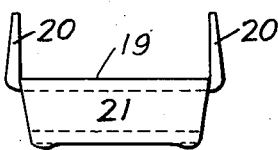
Fig. 10 is a side elevational view of the link shown in Fig. 9.
Figure 11:
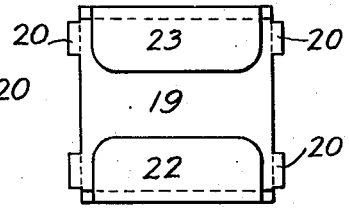
Fig. 11 is a bottom plan view of the links shown in Figs. 9 and 10.
Figure 12:
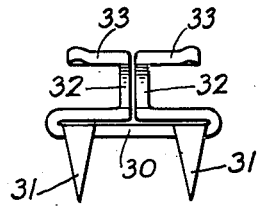
Fig. 12 is an end elevational view of a single runner link.

Referring now specially to the drawings and in which like reference characters refer to like parts throughout, a coat, having a body 15 is shown and having a sleeve 16 secured thereto by my improved seam enclosing means as hereinafter described and in which a partially closed track 17 is shown composed of a plurality of links 18, 18 having prongs 20, 20 thereon, the said links having side walls 21, 21 with tapered ends to enable the track 17 to conform to varying elliptical or ovate shapes and having inwardly turned flanges 22 and 23 thereon, which said flanges 22 and 23 terminate short of each other, whereby a space 24 is formed therebetween with an enclosed area 25 being provided for purposes hereinafter described. The opposed inside corners of flanges 22 and 23 are rounded and bent slightly as indicated to facilitate the free movement of the runner hereinafter described between and through the track 17. The track links 18, 18 are preferably secured to a strip 26 of flexible woven material such as thin canvas or the like with the prongs 20, 20 being forced through the strip of material 26 and bent over downward into the material thereby firmly fixing the body portions 19, 19 of the links 18, 18 against the surface of the strip 26, the said links 18, 18 being spaced apart from each other a sufficient distance so that the strip of flexible material 26 can be bent into a complete circle and its ends joined or sewed together as may be desired thereby forming a complete circular partially closed track within which the runner operates as will be hereinafter described.

A runner designated as a whole as 28 is provided, which consists of a plurality of links 29, 29 attached to thin flexible material, each runner link 29 comprising a body portion 30 having pairs of prongs 31, 31 projecting from each of the ends of the body portion 30, the said body portion 30 being folded upon itself toward its center and turned at a right angle to the body portion 30 whereby web portions 32, 32 are provided and which have outwardly turned flanges or slide portions 33, 33 thereon with the web portions 32, 32 extending through the space 24 between the flanges 22 and 23 on the links 18, 18 the slide portions 33, 33 extending outward sufficiently so as to extend well over the flanges 22 and 23 on the links 18, 18 and with the slide portions 33, 33 being in the space 25 formed in the partially closed track links 18, 18. The outside corners of the slide portions 33, 33 are rounded and slightly bent as indicated to facilitate the free movement of the runner 28 through the track 17. The runner links 29, 29 are preferably fastened to a flexible strip 34 in spaced end-to-end relation with each other into a complete circular form so that the complete runner 28 is formed and which can be moved circumferentially in the track 17 so that the object to which the runner 28 is secured can be rotated throughout the entire circumference of a circle if it should be necessary or desirable to have such a range of movement. The slide portions 33, 33 are of sufficient width so they extend over the flanges 22, 23 on the links 18 so they cannot be removed from these links but move thereover easily by sliding upon the inner surfaces of the flanges 22 and 23, or if the track 17 and runner 28 are compressed together, the slide portions 33, 33 of runner links 29, 29 will move against the inner surface of the wall 19 of the links comprising the track. The length of the runner link 29 is slightly shorter than the length of the track link 18 in order to preclude the possibility of all spaces between the track links becoming aligned simultaneously with all spaces between the runner links thereby subjecting the entire mechanism to a possible frozen or jammed condition.

Figure 13:
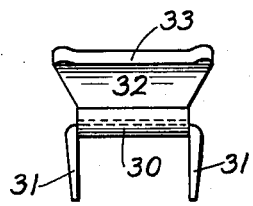
Fig. 13 is a side elevational view of the runner link shown in Fig. 12.
Figure 14:
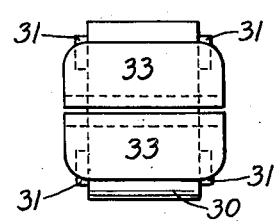
Fig. 14 is a top plan view of the runner link shown in Figs. 12 and 13.

The length of a track link 18 may be made shorter than the length of a runner link 29 for the same reason. As noted particularly in Fig. 13 the webs 32, 32 connecting the body portions of the links with the slide portions 33, 33 are diagonally disposed so that the slide portions 33, 33 to which they are connected are slightly longer than the body 30 of the link 29 forming the runner 28. This provision is desirable because in fitting the links 29 together to form the runner 28 they must be spaced apart sufficient to allow the strip 34 to flex into a circular, oval or ovate form and also permit the slide portions 33, 33 to be spaced rather closely together so that they will always bridge the space between any pair of the links 18, 18 which are placed in end-to-end relation with each other to form the track and to prevent the links 29 from becoming displaced between the ends of adjacent links 18, 18 forming the partially closed track.

In lieu of or in addition to tapering the side walls 21, 21 of track links 18 and web portions 32, 32 of the runner links, the track links and runner links may be constructed with a curvature imparted to either, or both, track and runner links, in order to minimize obstruction to free movement of the runner within the track, the degree of curvature varying in accordance with the radii required to meet specific applications of the complete unit.

In use, the strip or continuous circular band 26 is sewed to a portion of a garment such as 35 and the strip or continuous circular band 34 is secured along its end to a portion of a garment 36 or other flexible object. Of course, the strips 34 and 26 can be omitted if desired and the links 18 fastened directly to the fabric forming the garment and likewise the runner links 29 can be placed in the fabric forming the garment in end-to-end spaced relation with each other without the use of a strip such as 34 although for practical purposes of manufacture it might be desired to mount the track links and the runner links on strips or bands so that the strips or bands could be easily attached to the separate portions of a garment if used for securing a sleeve to the body of a garment or in such other similar situation.

In operation the track links and runner links could be made of thin flexible metal which could be formed in strips or individually upon a machine, stapled to tapes and thereafter the runner could be threaded into the track and the tapes cut into the required lengths and sewed together in circumferential relation so that a complete circular sliding seam closure is formed with the proper circumference to fit the desired needs, or the two units could be fastened into long strips, cut to the required lengths and sewed together in circular relation to form the unit of the desired size with the ends of the strips stitched together in such relation that the adjacent links are in proper register with each other so that the runner will move freely in a circumferential direction within the partially closed track or guide channel.

While I have described more or less precisely the details of construction, I do not wish to be understood as limiting myself thereto as I contemplate changes in form and the proportion of parts and the substitution of equivalents as circumstances may suggest or render expedient without departing from the spirit or scope of my invention.

I claim:

1. A flexible seam closure comprising in combination an endless partially enclosed flexible track, means whereby the said track is secured to flexible material, an endless connecting flexible runner having portions extending into and retained within the said track and freely movable therein and means whereby the said runner is secured to flexible material.

2. A flexible seam closure comprising in combination an endless partially enclosed flexible track, means whereby the said track is secured to flexible material, an endless flexible runner having portions extending into and retained within the said track, and means whereby the said runner is attached to flexible material, the said track and the material to which it is secured and the said runner and the material to which it is secured being freely movable in a circumferential direction relative to each other.

3. A seam closure comprising in combination a partially closed endless guide channel composed of a plurality of links in spaced relation with each other, means whereby the said guide channel is secured to a base material, an endless runner composed of a plurality of links in spaced relation with each other and having portions extending into and retained within the guide channel and freely movable within the guide channel, and means whereby the said runner is secured to flexible material.

4. A seam closure comprising in combination a partially closed endless track composed of a plurality of links in spaced end-to-end relation with each other whereby a continuous partially closed guideway is produced, means whereby the said links are secured to a flexible base material, an endless runner composed of a plurality of links in spaced end-to-end relation with each other, each link having a portion thereof extending into and retained within the partially enclosed guideway formed by the endless track and freely movable therein, and means whereby the links comprising the endless runway are secured to a flexible base material.

5. A seam closure comprising in combination a partially closed endless track composed of a plurality of links in spaced end-to-end relation with each other whereby a continuous partially closed guideway is produced, prongs in the said links comprising the guideway whereby the said links are secured to a flexible base material, an endless runner composed of a plurality of links in spaced end-to-end relation with each other, each link having a portion thereof extending into and retained within the partially enclosed guideway formed by the endless track and freely movable therein, and prongs in the said links comprising the runway whereby the said links are secured to a flexible base material.

6. A seam closure comprising in combination a partially closed endless track composed of a plurality of links in spaced end-to-end relation with each other whereby a continuous partially closed guideway is produced, means whereby the said links are secured to a flexible base material, an endless runner composed of a plurality of links in spaced end-to-end relation with each other, each link having a portion thereof extending into and retained within the partially enclosed guideway formed by the endless track and freely movable therein, and means whereby the links comprising the endless runway are secured to a flexible base material, the track and its base material and the runway and its base material being movable in a circumferential direction relative to each other.

7. A flexible seam forming device for connecting parts of garments comprising in combination an endless flexible partially enclosed track, means whereby the said flexible track is secured to flexible material, an endless flexible runner having portions extending into and retained within the said track, the endless track being formed to define an endless channel therein open circumferentially at one of its sides, the portions of the runner within the said track being wider than is the width of the circumferential opening in the said track, and means whereby the said flexible runner is attached to a flexible support member, the said track and the said runner being movable relative to each other in a circumferential direction and the flexible material to which the said track and runner are secured permitting lateral movement of the parts of the garments to which they are secured.

References Cited in the file of this patent

UNITED STATES PATENTS

| | | |
|---|---|---|
| 845,432 | Paschen | Feb. 26, 1907 |
| 1,022,997 | Anderson et al. | Apr. 9, 1912 |
| 1,487,349 | Mongelluzzo | Mar. 18, 1924 |
| 2,122,873 | Shuster | July 5, 1938 |
| 2,683,890 | Rosenbaum | July 20, 1954 |
| 2,683,891 | Rosenbaum | July 20, 1954 |

FOREIGN PATENTS

| | | |
|---|---|---|
| 3,267 | Switzerland | 1891 |